US009227575B2

(12) United States Patent
Bauer et al.

(10) Patent No.: US 9,227,575 B2
(45) Date of Patent: Jan. 5, 2016

(54) PROCESS AND ARRANGEMENT FOR OPERATING A VEHICLE HAVING A CAMERA ARRANGED ON AN OUTSIDE MIRROR

(71) Applicant: Bayerische Motoren Werke Aktiengesellschaft, Munich (DE)

(72) Inventors: Guenter Bauer, Petershausen (DE); Thomas Reicher, Grafing (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 249 days.

(21) Appl. No.: 14/065,828

(22) Filed: Oct. 29, 2013

(65) Prior Publication Data

US 2014/0118532 A1    May 1, 2014

(30) Foreign Application Priority Data

Oct. 30, 2012  (DE) .................. 10 2012 219 810

(51) Int. Cl.
*H04N 7/00* (2011.01)
*H04N 7/18* (2006.01)
*G08B 21/00* (2006.01)
*B60R 11/04* (2006.01)
*B60R 1/00* (2006.01)
*G08G 1/16* (2006.01)
*B60R 1/12* (2006.01)

(52) U.S. Cl.
CPC . *B60R 11/04* (2013.01); *B60R 1/00* (2013.01); *G08G 1/16* (2013.01); *B60R 2001/1253* (2013.01)

(58) Field of Classification Search
CPC .. B60R 1/00; B60R 11/04; B60R 2001/1253; G08G 1/16

USPC .............................................. 348/113
See application file for complete search history.

(56) References Cited

U.S. PATENT DOCUMENTS

| 2004/0196368 | A1 | 10/2004 | Asai | |
|---|---|---|---|---|
| 2011/0169957 | A1* | 7/2011 | Bartz | B60R 1/00 348/149 |
| 2012/0146789 | A1* | 6/2012 | De Luca | G08B 21/12 340/540 |

FOREIGN PATENT DOCUMENTS

| DE | 20 2005 006 903 U1 | 10/2006 |
|---|---|---|
| DE | 60 2004 000 387 T2 | 10/2006 |
| DE | 10 2009 031 809 A1 | 1/2011 |
| DE | 10 2010 005 638 A1 | 7/2011 |

OTHER PUBLICATIONS

German Search Report with English translation dated Sep. 2, 2013 (10 pages).

* cited by examiner

*Primary Examiner* — Hee-Yong Kim
(74) *Attorney, Agent, or Firm* — Crowell & Moring LLP

(57) ABSTRACT

In a process for operating a vehicle having an outside mirror on which a camera is arranged and which is swivelable by a swiveling device between a first end position and a second end position, first picture data and second picture data of a first picture and of a second picture captured by the camera are provided. As a function of the first and second picture data, it is determined whether an object is imaged in both pictures. If an object is imaged in both pictures, as a function of the first and second picture data, a distance from the object relative to a reference point with respect to the camera is determined. As a function of the determined distance, the swiveling device is triggered such that it contributes to the fact that the distance is greater than or equal to a predefined minimum distance value.

12 Claims, 2 Drawing Sheets

PROCESS AND ARRANGEMENT FOR OPERATING A VEHICLE HAVING A CAMERA ARRANGED ON AN OUTSIDE MIRROR

CROSS REFERENCE TO RELATED APPLICATIONS

This application claims priority under 35 U.S.C. §119 from German Patent Application No. DE 10 2012 219 810.5, filed Oct. 30, 2012, the entire disclosure of which is expressly incorporated by reference herein.

BACKGROUND AND SUMMARY OF THE INVENTION

The invention relates to a process and an arrangement for operating a vehicle having an outside mirror on which a camera is arranged and which can be swiveled by way of a swiveling device between a first end position and a second end position.

Vehicles are increasingly equipped with several cameras which are arranged on the outside, thus at the periphery of the vehicle. Such a camera may, for example, be arranged on an outside mirror of the vehicle. Such cameras can, for example, help the vehicle driver discern the exterior area of the vehicle.

It is an object of the invention to provide a process and an arrangement which respectively contribute to preventing a collision of an outside mirror of a vehicle with an object.

This and other objects are achieved by providing a process, and an arrangement, for operating a vehicle having an outside mirror on which a camera is arranged and which can be swiveled by a swiveling device between a first end position and a second end position. The first end position represents a retracted condition and the second end position represents an extended condition of the outside mirror. First picture data of a first picture captured by the camera are provided. In addition, second picture data of a second picture captured by the camera are provided. As a function of the first and the second picture data, it is determined whether an object is pictured in both pictures. If it was determined that an object is pictured in both pictures, a distance from the object is determined relative to a reference point with respect to the camera, as a function of the first and second picture data. The swiveling device is triggered as a function of the determined distance such that the distance is greater or equal to a predefined minimum distance value.

In that at least two pictures of the camera are detected, which are pictured in the at least two pictures, it becomes possible to determine the distance from a reference point to the respective object. This can, for example, take place by use of trigonometry in that a triangle is set up between the two pictures of the respective object and the reference point and, by means of trigonometric functions, the lateral lengths of the triangle are determined which represent the distance from the object. In addition to the camera, no sensors may be necessary for detecting the distance. Since the position of the camera and the geometry of the mirror are known, this may contribute to preventing an imminent collision of the outside mirror with an object.

For the detection of the object, distinctive points, for example, are determined in the first picture and are compared with distinctive points in the second picture, for example, corners and/or edges. When several objects are detected, the respective distance can, for example, be determined for each object.

The reference point is, for example, a reference point in the camera and/or predefined point on the surface of the outside mirror.

According to an advantageous embodiment, the first and the second picture are captured during a swiveling of the outside mirror. As a result, during an extending or retracting operation of the outside mirror, this may, for example, contribute to preventing a collision of the outside mirror with an object.

According to a further advantageous embodiment, the distance from the object is determined as a function of a first position of the camera which correlates with a point-in-time at which the first picture is captured, and, as a function of a second position of the camera which correlates with a point-in-time at which the second picture is captured. Specifically, during a swiveling operation of the outside mirror, it may be advantageous to use the respective position of the camera for determining the distance from the object.

According to a further advantageous development, the swiveling device is triggered as a function of the determined distance in such a manner that it contributes to the fact that the distance is greater than or equal to a predefined minimum distance value in that the swiveling is stopped when a minimum distance value has been reached. This may, for example, in a simple manner, contribute to preventing a collision when the outside mirror is extended or retracted.

According to a further advantageous embodiment, the first and the second picture are captured at points-in-time at which the outside mirror is positioned in the second end position. For example, when driving through a narrow area, this may contribute in a simple manner to preventing a collision.

According to a further advantageous development, the camera has a fisheye lens. A large environment, for example, can thereby be captured by the camera.

According to a further advantageous development, the swiveling device is triggered as a function of the determined distance such that it contributes to the fact that the distance is greater than or equal to a predefined minimum distance value. The outside mirror is swiveled into the first end position when the minimum distance value has been reached. By retracting the outside mirror, a collision with the object may be effectively prevented.

Other objects, advantages and novel features of the present invention will become apparent from the following detailed description of one or more preferred embodiments when considered in conjunction with the accompanying drawings.

DETAILED DESCRIPTION OF THE DRAWINGS

Elements of the same construction and function have the same reference numbers in all figures.

Figure 1:
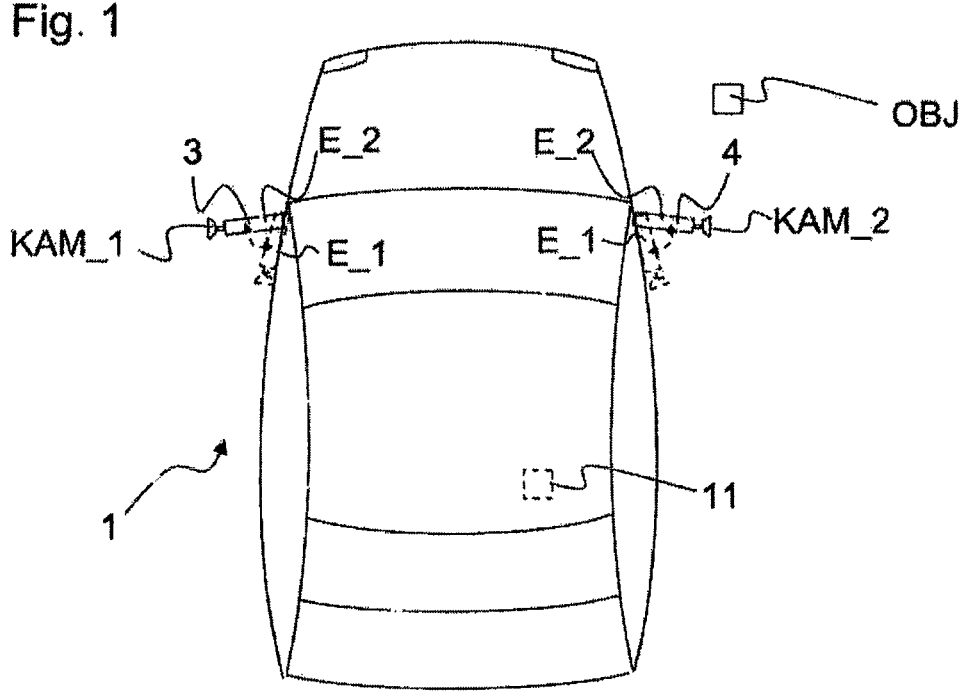
FIG. 1 is a view of a vehicle having a control device and a swivelable outside mirror.

A vehicle (FIG. 1) has an outside mirror 3 on a first side and an outside mirror 4 on a second side. A first camera KAM_1 is arranged on the outside mirror 3 on the first side and a second camera KAM_2 is arranged on the outside mirror 4 on the second side. The outside mirrors 3 and 4 can each be swiveled by way of a swiveling device between a first end position E_1 and a second end position E_2, the first end position E_1 representing a retracted condition and the second end position E_2 representing an extended condition of the respective outside mirror 3, 4.

The swiveling device, for example, has an actuator, such as an electric motor.

The cameras KAM_1, KAM_2 are constructed and arranged for acquiring at least a portion of the environment of the vehicle. They advantageously each have a fisheye lens for this purpose in order to capture an environment that is as large as possible.

The vehicle 1 further has a control device 11 which is coupled, with respect to the signals, with the cameras KAM_1, KAM_2 in such a manner that first picture data DAT_1 of a first picture P_1 captured by the first camera KAM_1 and/or the second camera KAM_2 and second picture data DAT_2 of a second picture P_2 captured by the first camera KAM_1 and/or the second camera KAM_2 can be received.

The control device 11 has a data and program memory and also has a computer unit in which programs are processed during the operation of the vehicle, which programs are stored particularly in the data and program memory.

The control device 11 may also be called a device for operating a vehicle 1.

Figure 2:
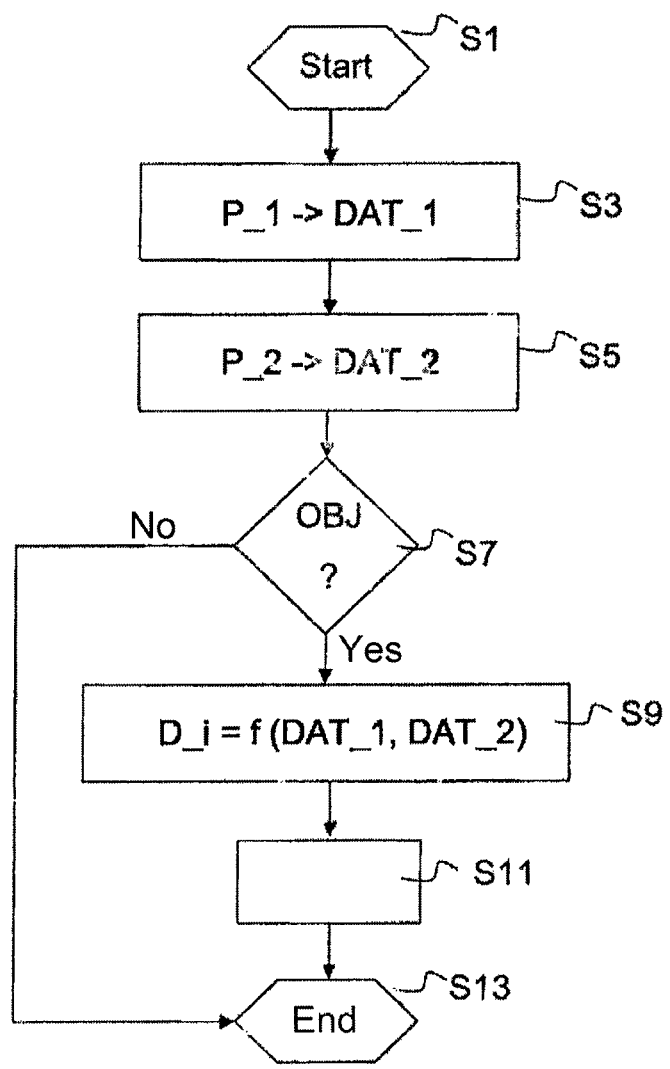
FIG. 2 is a view of a flow chart of a program which is processed in the control device.

A program for operating the vehicle 1, which is processed in the control device 11, is started in a Step S1 (FIG. 2) in which, as required, variables can be initialized. The program is, for example, implemented for the outside mirror 4 on the second side and the second camera KAM_2. However, it may also be implemented for the outside mirror 3 on the first side and the first camera KAM_1.

In a Step S3, the picture data DAT_1 of the first picture P_1 are provided, which was captured by the second camera KAM_2. The first picture data DAT_1 are provided for the further processing in the following steps.

In a Step 5, the second picture data DAT_2 of the second picture P_2, are provided, which was captured by the second camera KAM_2 for the further processing in the following steps.

The first picture P_1 and the second picture P_2 can be captured, for example, during a swiveling of the outside mirror 4.

As an alternative or in addition, the first picture P_1 and the second picture P_2 can be captured at points-in-time at which the outside mirror 4 is positioned in the second end position E_2 and/or in another position.

In a Step S7, it is determined as a function of the first and the second picture data DAT_1, DAT_2 whether an object OBJ is imaged in both pictures P_1, P_2. For this purpose, a search takes place, for example, in the two pictures P_1, P_2 for distinctive picture elements, and these are compared with one another.

If no object OBJ, which was imaged in both pictures P_1, P_2, was determined, the program will be continued in Step S13.

If one or more object(s) OBJ were determined, which are imaged in both pictures, the program will be continued in step S9.

In Step S9, a respective distance D_i from each object OBJ determined in Step S7 relative to a reference point with respect to the camera KAM_2 is determined.

It may be advantageous for the respective distance D_i from the object OBJ to be determined as a function of a first position of the second camera KAM_2, which correlates with a point in time at which the first picture P_1 is captured and, as a function of a second position of the second camera KAM_2, which correlates with a point in time at which the second picture P_2 is captured. This is, for example, advantageous when the first picture P_1 and the second picture P_2 are captured during a swiveling of the outside mirror 4.

In Step S11, the swiveling device is triggered as a function of the determined distance D_i in such a manner that it contributes to the fact that the distance D_i is greater than or equal to a predefined minimum distance value. The minimum distance value is, for example, predefined such that the outside mirror 4 does not touch the object OBJ, or that only a slight distance D_i still exists between the outside mirror 4 and the object OBJ when the distance D_i is equal to the minimum distance value. When several distances D_i are determined in Step S9, because several objects OBJ were determined, it may be advantageous to carry out Step S11 for the object OBJ with the smallest distance D_i.

The swiveling device may, for example, be triggered such that a swiveling of the outside mirror 4 will be stopped when the distance D_i is greater than or equal to a predefined minimum distance value.

As an alternative or in addition, the swiveling device may, for example, be triggered such that the outside mirror 4 is swiveled into the first end position E_1 when the distance D_i is greater than or equal to a predefined minimum distance value.

In Step S13, the program is terminated and, if required, may be restarted in Step S1.

As a result, it becomes possible, for example, when passing through a narrow passage, to prevent a possible collision of the outside mirror 3, 4 with an object OBJ.

As an alternative or in addition, it becomes possible to, if required, prevent a collision with an object OBJ when retracting or extending the outside mirror 3, 4.

LIST OF REFERENCE SYMBOLS

1 Vehicle
3, 4 Outside mirror
11 Control device
D_i Distance
DAT_1 First picture data
DAT_2 Second picture data
E_1 First end position
E_2 Second end position
KAM_1, KAM_2 Cameras
OBJ Object
P_1 First picture
P_2 Second picture The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for operating a vehicle having an outside mirror on which a camera is arranged, the outside mirror being swivelable via a swiveling device between a first end position and a second end position, wherein the first end position represents a retracted condition of the mirror and the second end position represents an extended condition of the outside mirror, the process comprising the acts of:

receiving first picture data of a first picture captured by the camera;

receiving second picture data of a second picture captured by the camera;

determining, as a function of the first and second picture data, whether an object is imaged in both pictures;

if a determination is made that an object is imaged in both pictures, determining a distance from the object relative to a reference point with respect to the camera as a function of the first and second picture data; and as a function of the determined distance, triggering the swiveling device such that the swiveling device operates to maintain a distance from the object that is greater than or equal to a predefined minimum distance value.

2. The process according to claim 1, further comprising the act of capturing the first and the second picture by the camera during a swiveling of the outside mirror.

3. The process according to claim 2, wherein the distance from the object is determined as a function of a first position of the camera, which correlates with a point-in-time at which the first picture is captured and, as a function of a second position of the camera, which correlates with a point-in-time at which the second picture is captured.

4. The process according to claim 2, wherein operation of the swiveling device is stopped when the predefined minimum distance value has been reached.

5. The process according to claim 3, wherein operation of the swiveling device is stopped when the predefined minimum distance value has been reached.

6. The process according to claim 1, further comprising the act of capturing the first and the second picture at points-in-time at which the outside mirror is positioned in the second end position.

7. The process according to claim 1, wherein the camera comprises a fisheye lens.

8. The process according to claim 1, wherein the swiveling device is operated to swivel the outside mirror into the first end position when the predefined minimum distance value is reached.

9. A vehicle arrangement, comprising:
an outside mirror arranged on the vehicle;
a camera arranged on the outside mirror;
a swiveling device configured to swivel the outside mirror between a first end position and a second end position, the first end position representing a retracted condition of the outside mirror and the second end position representing an extended condition of the outside mirror;
a control unit operatively coupled to receive picture data from the camera and to control operation of the swiveling device, the control unit comprising a non-transitory computer readable medium having stored thereon program code segments that:
determine, as a function of first and second picture data of first and second pictures captured, respectively, by the camera, whether an object is imaged in both pictures;
determine, if it was determined that an object is imaged in both pictures, a distance from the object relative to a reference point with respect to the camera as a function of the first and second picture data; and
trigger, as a function of the determined distance, the swiveling device such that the swiveling device operates to control a distance to the object that is greater than or equal to a predefined minimum distance value.

10. The arrangement according to claim 9, wherein the program code determines a distance from the object as a function of a first position of the camera, which correlates with a point-in-time at which the first picture is captured and, as a function of a second position of the camera, which correlates with a point-in-time at which the second picture is captured.

11. The arrangement according to claim 10, wherein the program code segments control the swiveling device to stop when the predefined minimum distance value has been reached.

12. The arrangement according to claim 10, wherein the program code segments control the swiveling device to swivel the outside mirror into the first end position when the predefined minimum distance value is reached.

* * * * *